United States Patent [19]

Matsui et al.

[11] Patent Number: 4,538,098
[45] Date of Patent: Aug. 27, 1985

[54] METHOD AND APPARATUS FOR CONTROLLING ELECTRIC DISCHARGE MACHINE

[75] Inventors: Mitsuo Matsui, Tokyo; Teruyuki Matsumura, Hachioji, both of Japan

[73] Assignee: Fanuc Ltd., Minamitsuru, Japan

[21] Appl. No.: 398,902

[22] Filed: Jul. 16, 1982

[30] Foreign Application Priority Data

Jul. 21, 1981 [JP] Japan ................... 56-114059

[51] Int. Cl.$^3$ ............................................... B23P 1/08
[52] U.S. Cl. ..................................... 318/567; 318/624
[58] Field of Search ............... 219/69 C, 69 M, 69 G; 318/567, 624

[56] References Cited

U.S. PATENT DOCUMENTS 3,731,044  5/1973  Ullmann et al.
4,005,303  1/1977  Inoue ............................... 219/69 C

FOREIGN PATENT DOCUMENTS 2443712  7/1980  France .

Primary Examiner—William M. Shoop
Assistant Examiner—Saul M. Bergmann
Attorney, Agent, or Firm—Staas & Halsey

[57] ABSTRACT

A method and apparatus for controlling an electric discharge machine wherein a motor for moving an energized electrode relative to a workpiece is driven in accordance with command data. The method includes the steps of storing in a memory retraction control information contained in the command data, moving the electrode in an advancing direction relative to the workpiece by controlling the speed of the motor in accordance with machining feed speed information contained in the entered command data, monitoring the current position of the electrode by counting, via a counting device, pulses generated by a sensor whenever the motor rotates by a predetermined amount, moving the electrode in the retracting direction relative to the workpiece by reading in retraction speed from the retraction control information stored in the memory and controlling the speed of the motor on the basis of the retraction speed, when a signal indicative of a short circuit is generated, and moving the electrode in the advancing direction relative to the workpiece by reading in a re-advancing speed from the retraction control information stored in the memory, when a signal indicative of an end to the short circuit is generated.

19 Claims, 5 Drawing Figures

METHOD AND APPARATUS FOR CONTROLLING ELECTRIC DISCHARGE MACHINE

BACKGROUND OF THE INVENTION

This invention relates to a method and apparatus for controlling an electric discharge machine and, more particularly, to a method and apparatus for controlling an electric discharge machine of the type in which an electrode of a prescribed shape, held close to the surface of a workpiece, is moved into the workpiece to perform cutting and an electric discharge is produced between the electrode and the workpiece, thereby to machine the workpiece into the same shape as the electrode.

Electric discharge machines include: (1) a wire-cut electric discharge machine wherein a wire electrode is moved relative to a workpiece along a commanded path, thereby to perform electric discharge machining; and (2) an electric discharge machine wherein an electrode of a prescribed shape, held close to the surface of a workpiece, is moved into the workpiece to perform cutting and an electric discharge is produced between the electrode and the workpiece, thereby to machine the workpiece into the same shape as the electrode.

Figure 1:
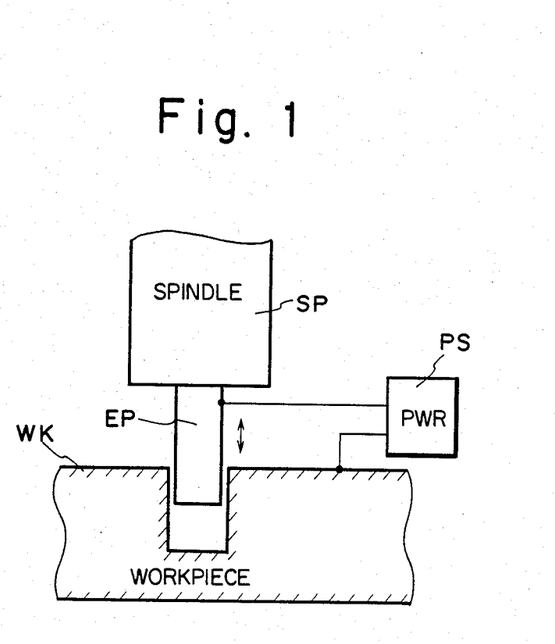
FIG. 1 is a view of an electric discharge machine to which the present invention is applied.

FIG. 1 is a view of the latter type electric discharge machine. An electrode EP serving as a punch is supported by a spindle SP, and is fed for machining (i.e., advanced) in the direction of the arrow by a servomotor, not shown. A voltage is applied by a power source PS across the electrode EP and a workpiece WK, which is to be machined into a die. Accordingly, when the electrode EP is advanced while a minute gap is maintained between the workpiece WK and the electrode EP, the workpiece WK is machined into a shape similar to that of the electrode EP. An enlarged bore of desired size can be readily machined in the workpiece WK by controlling, e.g., the machining pulses and the energy. If necessary, the machining operation is carried out while the electrode EP is being moved in an eccentric fashion, whereby an enlarged bore of any desired dimensions can be machined.

Figure 2:
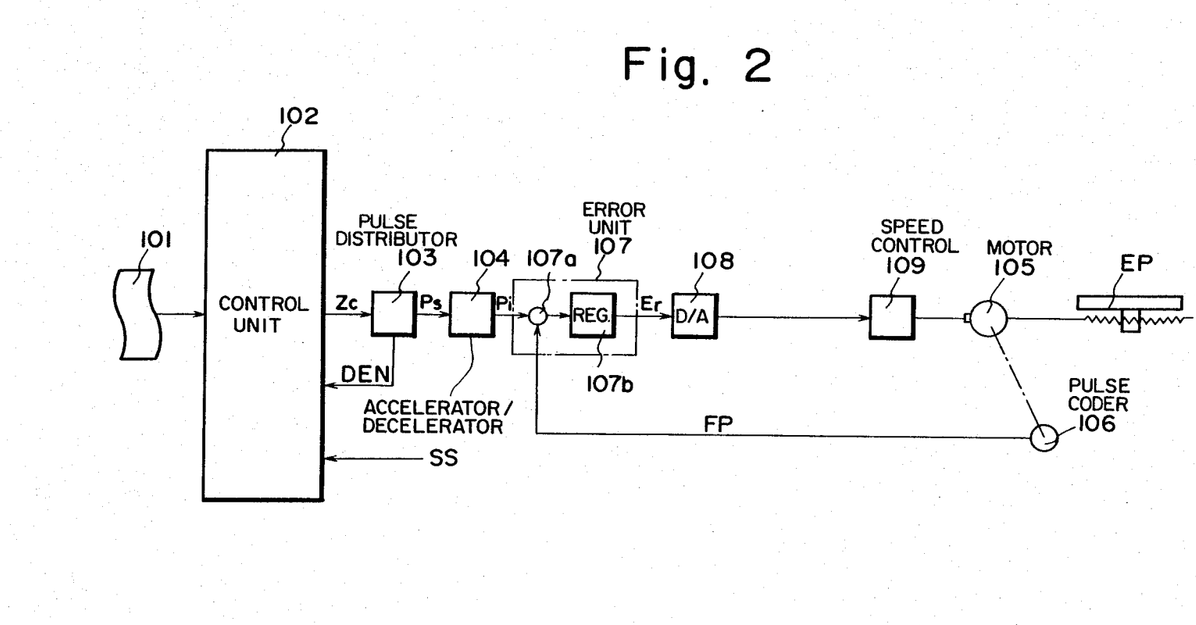
FIG. 2 is a block diagram illustrating a control circuit of an electric discharge machine and is useful in describing the prior art.

In the electric discharge machine of the above type, it is necessary to retract the electrode immediately upon the generation of a short-circuit signal which is produced when the electrode EP contacts the workpiece WK. However, with the conventional servomotor control method, it is not possible to retract the electrode EP immediately, even though the direction of electrode movement is changed by the generation of the short-circuit signal. FIG. 2 is a view of a conventional servomotor control system and is useful in explaining this point.

Referring to FIG. 2, numeral 101 denotes a paper tape in which numerical control (NC) data is punched. Numeral 102 denotes a control unit which causes a tape recorder (not shown) to read in the NC command data from the paper tape 101, and which decodes the read NC data, delivering, e.g., M, S and T function commands to the machine side through a heavy current switchboard and a move command $Z_c$ to a pulse distributor 103, which is the succeeding stage. The pulse distributor 103 executes well-known pulse distribution computations on the basis of the move command $Z_c$, and generates distributed pulses $P_s$ at a frequency corresponding to a commanded speed. Numeral 104 designates a known accelerator/decelerator circuit which generates a train of pulses $P_i$ by rectilinearly accelerating the pulse rate of the train of distributed pulses $P_s$ at the occurrence of the pulse train $P_s$ and by rectilinearly decelerating the same at the end thereof. Numeral 105 indicates a D.C. motor by which the electrode EP is fed for machining. A pulse coder 106 generates one feedback pulse FP each time the DC motor 105 rotates by a predetermined amount. An error calculating and storing unit 107 is constructed of, for example, a reversible counter, and stores the difference $E_r$ between the number of the input pulses $P_i$ received from the accelerator/decelerator circuit 104 and that of the feedback pulses FP. This error calculating and storing unit 107 may be constructed, as shown in the figure, of an arithmetic circuit 107a for calculating the difference $E_r$ between the numbers of the pulses $P_i$ and FP, and an error register 107b for storing the error $E_r$. More specifically, assuming that the DC motor 105 is rotating in the forward direction because of a command to that effect, the error calculating and storing unit 107 operates in such a manner that each time the input pulse $P_i$ is generated, it countes up by means of the arithmetic circuit 107a, while each time the feedback pulse FP is generated, it counts down, and the difference $E_r$ between the number of input pulses and the feedback pulses is stored in the error register 107b. Numeral 108 denotes a digital-to-analog converter for generating an analog voltage proportional to the content (digital value) of the error register 107b, and numeral 109 is a speed control circuit. The digital-to-analog (D/A) converter 108 and speed control circuit 109 comprise a motor drive circuit.

When the control unit 102 produces the move command $Z_c$, the pulse distributor 103 executes the pulse distribution computation and provides the distributed pulses $P_s$. Upon receiving the pulses $P_s$, the accelerator/decelerator circuit 104 accelerates and decelerates the pulse rate thereof and applies the train of command pulses $P_i$ to the error calculating and storing circuit 107. Thus, the content of the error register 107b becomes non-zero, so that the digital-to-analog converter 108 provides a voltage and the motor 105 is driven by the speed control circuit 109 so as to move the electrode EP. When the motor 105 has rotated by a predetermined amount, the feedback pulse FP is generated by the pulse coder 106 and is applied to the error calculating and storing unit 107. Thenceforth, the electrode EP is servo-controlled with the difference $E_r$ maintained at a constant value in a steady state until it is fed for machining to a desired, or target, position.

When the electrode EP is being fed for machining and comes into contact with the workpiece, a short-circuit signal SS is generated. When this occurs, a retraction control section within the control unit 102 sends the pulse distributor 103 a command for retracting the electrode EP. The pulse distributor 103 responds to the retraction command by generating retraction, or "backup", pulses BS that cause the content of error register 107b to become zero after a predetermined time. From then on the electode EP is retracted or backed up by the retraction pulses to separate from the workpiece.

It will be appreciated from the foregoing description of the the conventional method of FIG. 2 that, despite the generation of the short-circuit signal SS, the electrode EP will not back up unless the pulse number left in the error register 107b (which remaining pulse number is the result of the distributed pulses for forward movement) is stepped down to zero. In other words, retraction of the electrode EP does not start until the content of error register 107b becomes zero, which occurs after the passage of a predetermined length of time. Moreover, despite the generation of the short-circuit signal SS, the content of the error register 107b is not stepped down to zero until the lapse of said predetermined length of time, so that the electrode EP continues to advance until the content of the error register 107b becomes zero. This delays the retraction of the electrode and the resumption of machining, and thereby prolongs machining time.

SUMMARY OF THE INVENTION

An object of the present invention is to provide a method and apparatus for controlling an electric discharge machine in such a fashion that the electrode is retracted immediately upon the occurrence of a short circuit between the electrode and a workpiece and is then advanced for machining as soon as the short-circuited condition ends.

Another object of the present invention is to provide a method and apparatus for controlling an electric discharge machine in such a fashion that the length of machining time is not significantly prolonged upon the occurrence of a short circuit between the electrode and a workpiece.

A further object of the present invention is to provide a method and apparatus for controlling an electric discharge machine wherein there is little decline in machining efficiency upon the occurrence of a short circuit between the electrode and a workpiece.

A method and apparatus for controlling an electric discharge machine wherein a motor for moving an energized electrode relative to a workpiece is driven in accordance with command data. The method includes the steps of storing in a memory retraction control information contained in the command data, moving the electrode in an advancing direction relative to the workpiece by controlling the speed of the motor in accordance with machining feed speed information contained in the entered command data, monitoring the current position of the electrode by counting, via a counting device, pulses generated by a sensor whenever the motor rotates by a predetermined amount, moving the electrode in the retracting direction relative to the workpiece by reading in retraction speed from the retraction control information stored in the memory and controlling the speed of the motor on the basis of the retraction speed, when a signal indicative of a short circuit is generated, and moving the electrode in the advancing direction relative to the workpiece by reading in a re-advancing speed from the retraction control information stored in the memory, when a signal indicative of an end to the short circuit is generated.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 3:
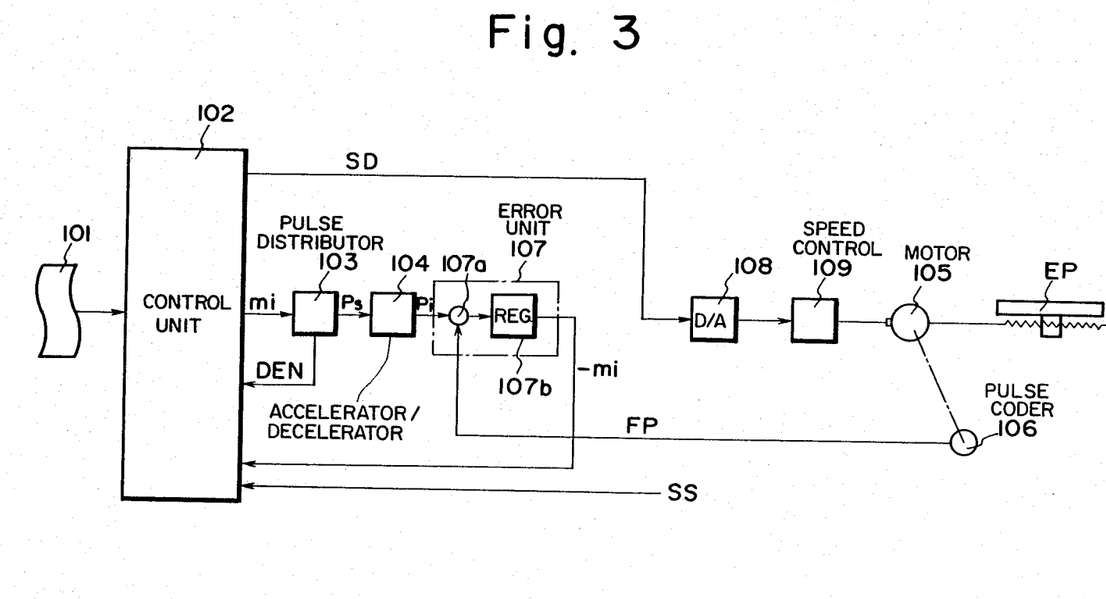
FIG. 3 is a block diagram illustrating an embodiment of an electric discharge machine control system according to the present invention.

The arrangement of FIG. 3, showing an embodiment of the present invention, differs from the conventional arrangement of FIG. 2 in the following respects:

(a) The control unit 102 produces a digital speed command SD.

(b) There is no connection between the error register 107b and the D/A converter 108.

(c) The motor 105 is driven in accordance with a voltage obtained by converting, into an analog signal, the speed command D/A delivered by the control unit 102.

(d) The current position of the electrode EP can be determined by a follow-up technique or the like, to be described later.

Figure 4:
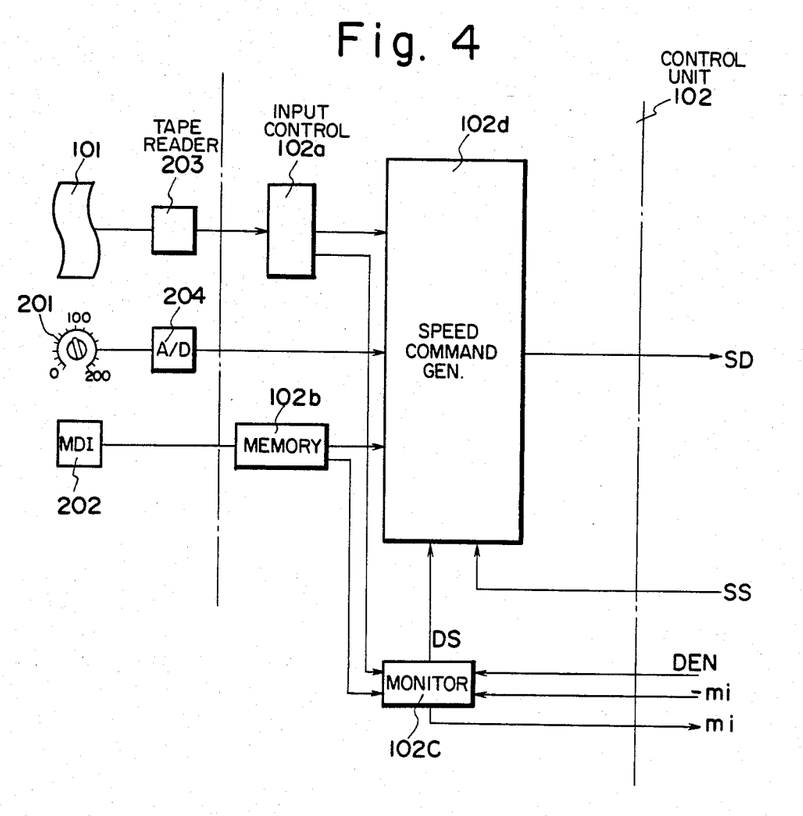
FIG. 4 is a block diagram illustrating a principal portion of the embodiment shown in FIG. 3.
Figure 5:
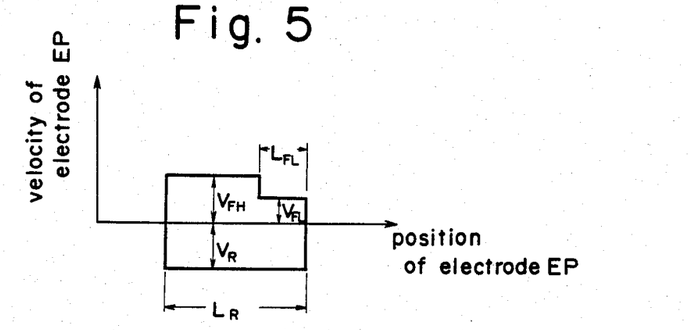
FIG. 5 is an illustrative view useful in describing retraction control in accordance with FIGS. 3 and 4.

Referring now to FIG. 4 to describe the method of generating the digital speed command SD, numeral 101 denotes a paper tape in which numerical control (NC) data is punched, 102 the control unit, 201 an over-ride switch for over-riding the feed speed within a range of 0 to 200%, 202 a manual data input device (referred to as an MDI) for entering one block of NC data, correction data and retraction control information, 203 a paper tape reader for reading the NC data punched in the paper tape 101, and 204 an analog-to-digital (A/D) converter for converting the over-ride quantity, entered by the over-ride switch 201, into a digital value. In order to generate the command for specifying the travelling speed of the electrode, the control unit 102 has an input control device 102a for discriminating and delivering the feed speed command from among the NC data read in from the paper tape, a retraction memory 102b for storing the retraction command information entered by the MDI 202, a monitoring device 102c for monitoring the amount of movement of the electrode, and a speed command generating device 102d for generating the digital speed command SD. The retraction control information is of various kinds. For example, with reference to FIG. 5, the information may specify the retractable limit $L_R$, retraction speed $V_R$, fast-forward speed $V_{FH}$ and slow-forward speed $V_{FL}$ when the electrode is advanced again following retraction, and the distance $L_{FL}$ specifying the point at which deceleration is effected from $V_{FH}$ to $V_{FL}$.

Next, reference will be had to FIGS. 3 and 4 to describe the operation of the present invention.

First, the amount of over-ride N (%) is set in the over-ride switch 201 (FIG. 4), and the retraction control information is entered from the MDI 202, this information being stored in the retraction memory 102b. These operations are performed by the operator in advance. When a positional command and speed command VC relating to the electrode are read in from the tape 101 by the tape reader 203, the input control device 102a discriminates the speed command VC and feeds it into the speed command generating device 102d. The latter produces a digital signal, equivalent to VC×N/100, as the speed command SD. The DA converter 108 (FIG. 3) converts the speed command SD into an analog voltage for rotating the motor 105 via the speed control circuit 109, thereby feeding the electrode EP to carry out machining at the commanded speed. As motor 105 rotates to transport the electrode EP, the pulse coder 106 generates a single feedback pulse FP each time the motor rotates by a predetermined amount. The content of error register 107b is updated, i.e., decremented by one step each time a feedback pulse FP is produced. If we assume that the content of the error register 107b initially is zero, then its content will be decremented to $-m_1$ by the generation of $m_1$ − number of feedback pulses. The $-m_1$ data is read by the movement monitoring device 102c of the control unit 102, which then performs the operation:

$$M + m_1 \rightarrow M \qquad (1)$$

where the initial value of M is zero. In addition, the content of error register 107b is applied to to the pulse distributor 103 after its sign is changed. The pulse distributor 103 responds to the $m_1$ data by immediately performing a pulse distribution operation to produce the distributed pulses $P_s$. The distributed pulses $P_s$ enter the accelerator/decelerator circuit 104 which responds by producing the command pulses Pi. These pulses are applied to the error computing and storing unit 107, the content of the error register 107b being updated by one in the positive direction each time a pulse $P_i$ arrives. The error computing and storing unit 107 concurrently receives the feedback pulses FP at its other input as long as the motor 105 is rotating. These pulses update the error register 107b by one in the negative direction each time a pulse arrives. Accordingly, if we assume that the time at which the content $-m_1$ is read out of error register 107b is $t_1$, that the time at which the $m_1$ − number of distributed pulses $P_s$ is generated is $t_2$, and that $m_2$ − number of feedback pulses FP are generated between times $t_1$ and $t_2$, then the content of error register 107b at time $t_2$ will be $-m_2$.

The pulse distributor 103, upon producing the number of distributed pulses $P_s$ commensurate with the magnitude of the command, issues a signal DEN indicative of the end of the pulse distribution operation. The monitoring device 102c of the control unit 102 responds to the signal DEN by once again reading the content ($-m_2$) of the error register 107b, whereupon the control unit performs the addition:

$$M + m_2 \rightarrow M \qquad (1')$$

In addition, the data $m_2$ is applied to the pulse distributor 103. Owing to the operation (1') above, M is equal to $m_1 + m_2$. Thenceforth, each time the pulse distribution end signal is generated, the positional control circuit 102c reads the content $m_i(i=1,2,3 \ldots)$ of the error register 107b, the counter 102d performs the addition:

$$M + m_i \rightarrow M \ (=\Sigma m_i) \qquad (1'')$$

and the numerical value $M_i$ is applied to the pulse distributor 103. From then on the aforesaid operations are repeated.

The foregoing is summarized by the following table:

| Time | t1 | t2 | t3 | — | ti | — | tj | tj + 1 |
|---|---|---|---|---|---|---|---|---|
| Number of pulses FP generated | $m_1$ | $m_2$ | $m_3$ | ... | $m_i$ | ... | $m_j$ | 0 |
| Number of pulses Ps | 0 | $m_1$ | $m_2$ | ... | $m_{i-1}$ | ... | $M_{j-1}$ | $m_j$ |

-continued

| Time | t1 | t2 | t3 | — | ti | — | tj | tj + 1 |
|---|---|---|---|---|---|---|---|---|
| Content of error register | $-m_1$ | $-m_2$ | $-m_3$ | ... | $-m_i$ | ... | $-m_j$ | 0 |

In the table shown above, t1 is the time at which the content of error register 107b is initially read, ti (i=1,2 . . . ) is the time at which the pulse distribution end signal is generated, and $m_i$ represents the number of feedback pulses produced between time ti−1 and time ti. It will be appreciated from the table that the total number M of feedback pulses FP produced up to time tj+1 may be expressed by the following:

$$M = \sum_{i=1}^{j+1} m_i$$

which is precisely in agreement with the sum total exhibited by the error register 107b. Accordingly, if the movement monitoring device 102c counts up to the total M and M is compared with the commanded amount of movement, which is based on the positional command from the input control device 102a, and if the monitoring device delivers a stop command DS to the speed command generating device 102d to send the speed command SD to zero when M and the commanded amount of movement coincide, then the motor 105 will be stopped substantially instantly to halt the electrode EP at the target position. This technique of determining the present position of a movable member through the foregoing control operation is referred to as follow-up control.

There is another method of determining the position of the electrode EP without relying upon follow-up control. This entails severing the connection between the accelerator/decelerator circuit 104 and the error computing and storing unit 107 in FIG. 3, so that the latter receives only the feedback pulses. The control unit 102 is adapted to read the content of the error register 107b at a given sampling cycle, with the error register 107b being cleared to zero at the same time that it is read. The control unit 102 keeps a running total of the number of feedback pulses read each sampling cycle, so that the present position of the electrode can always be known.

When the electrode EP contacts the workpiece as it is being fed for machining, the short-circuit signal SS is generated. When this occurs, the speed command generating device 102d reads the retraction speed $V_R$ out of the retraction memory 102b and delivers it as the speed command SD. It should be noted that the sign of the retraction speed signal VR is decided by the speed command generating device 102d in such a manner that the direction of movement is reversed from what it was just prior to the generation of the short-circuit signal SS. Thereafter, the D/A converter 108 converts the signal SD to an analog signal, and control is executed in the manner described above, whereby the motor 105 is rotated in the reverse direction to begin retracting the electrode EP, i.e., to break the short circuit. When the latter occurs (that is, when the short-circuit signal SS changes state from the high to low level), the speed command generating device 102d reads the fast-forward speed $V_{FH}$ out of the retraction memory 102b and delivers it as the speed command SD. As a result, the electrode EP changes direction and is advanced as the speed $V_{FH}$. The monitoring device 102c, meanwhile, is monitoring the position of the electrode EP by means of the follow-up method described above. When the monitoring device 102c detects that the electrode EP has moved to the position $L_{FL}$ just short of the point at which retraction started, it issues a deceleration signal DS to which the speed command generating device 102d responds by reading the slow-forward speed $V_{FL}$ out of the retraction memory 102b. In consequence, the electrode EP is advanced at low speed through the control operations just described.

In accordance with the present invention as described and illustrated hereinabove, the electrode can be retracted immediately at the instant a short circuit occurs, and advanced for machining as soon as the short circuit is overcome. The result is an electric discharge machining operation of improved efficiency owing to a shorter machining time.

Although a certain preferred embodiment has been shown and described in detail, it should be understood that many changes and modifications may be made therein without departing from the scope of the appended claims.

What we claim is:

1. A method of controlling an electric discharge machine wherein a motor, for establishing relative movement between an energized electrode and a workpiece, is driven in accordance with command data in order to machine the workpiece to a desired shape by an electric discharge produced between the electrode and workpiece, the electric discharge machine including a memory, counting means and a sensor, said method comprising the steps of:
    (a) entering the command data;
    (b) storing in the memory retraction control information contained in the entered command data;
    (c) moving the electrode in an advancing direction relative to the workpiece by controlling the speed of the motor in accordance with machining feed speed information contained in the entered command data;
    (d) monitoring the current position of the electrode by counting, via the counting means, sensor pulses generated by the sensor whenever the motor rotates by a predetermined amount;
    (e) moving the electrode substantially immediately in a retracting direction relative to the workpiece by reading in a retraction speed from the retraction control information stored in the memory and controlling the speed of the motor on the basis of the retraction speed, when a signal indicative of a short circuit is generated; and
    (f) moving the electrode in the advancing direction relative to the workpiece by reading in a readvancing speed from the retraction control information stored in the memory, when a signal indicative of an end to the short circuit is generated.

2. A method of controlling an electric discharge machine wherein a motor, for establishing relative movement between an energized electrode and a workpiece, is driven in accordance with command data in order to machine the workpiece to a desired shape by an electric discharge produced between the electrode and workpiece, the electric discharge machine including a memory, counting means and a sensor, said method comprising the steps of:
    (a) entering the command data;
    (b) storing in the memory retraction control information contained in the entered command data;
    (c) moving the electrode in an advancing direction relative to the workpiece by controlling the speed of the motor in accordance with machining feed speed information contained in the entered command data;
    (d) monitoring the current position of the electrode by counting, via the counting means, sensor pulses generated by the sensor whenever the motor rotates by a predetermined amount, comprising the steps of:
        (di) counting, via the counting means, the sensor pulses generated by the sensor each time said motor rotates by a predetermined amount;
        (dii) reading the value of the count in the counting means at predetermined intervals;
        (diii) adding said read counted values cumulatively at said predetermined intervals to determine the present position of the electrode; and
        (div) sending a cancel command to the counting means each time its counted value is read, thereby to cancel said counted value;
    (e) moving the electrode in a retracting direction relative to the workpiece by reading in a retraction speed from the retraction control information stored in the memory and controlling the speed of the motor on the basis of the retraction speed, when a signal indicative of a short circuit is generated; and
    (f) moving the electrode in the advancing direction relative to the workpiece by reading in a readvancing speed from the retraction control information stored in the memory, when a signal indicative of an end to the short circuit is generated.

3. A method of controlling an electric discharge machine according to claim 2, wherein the step of sending a cancel command to said counting means further comprises clearing said counting means.

4. A method of controlling an electric discharge machine according to claim 2, wherein the step of sending a cancel command to said counting means comprises sending said counting means a number of cancelling pulses equivalent to said read counted value at said predetermined intervals.

5. A method of controlling an electric discharge machine according to claim 4, wherein said reading step comprises reading the counted value in said counting means after said cancelling pulses are sent thereto.

6. A method of controlling an electric discharge machine wherein a motor, for establishing relative movement between an energized electrode and a workpiece, is driven in accordance with command data in order to machine the workpiece to a desired shape by an electric discharge produced between the electrode and workpiece, the electric discharge machine including a memory, counting means and a sensor, said method comprising the steps of:
    (a) entering the command data;
    (b) storing in the memory retraction control information contained in the entered command data;
    (c) moving the electrode in an advancing direction relative to the workpiece by controlling the speed of the motor in accordance with machining feed speed information contained in the entered command data;
    (d) monitoring the current position of the electrode by counting, via the counting means, sensor pulses generated by the sensor whenever the motor rotates by a predetermined amount;

(e) moving the electrode in a retracting direction relative to the workpiece by reading in a retraction speed from the retraction control information stored in the memory and controlling the speed of the motor on the basis of the retraction speed, when a signal indicative of a short circuit is generated;

(f) moving the electrode in the advancing direction relative to the workpiece by reading in a readvancing speed from the retraction control information stored in the memory, when a signal indicative of an end to the short circuit is generated; and (g) controlling the relative movement of the electrode in the advancing direction by comparing the current position of the electrode, found in step (d), with positional information contained in said command data.

7. An apparatus for controlling an electric discharge machine wherein a motor for establishing relative movement between an energized electrode and a workpiece is driven in accordance with command data in order to machine the workpiece to a desired shape by an electric discharge produced between the electrode and workpiece, said apparatus comprising:

a memory for storing retraction control information contained in entered command data;

a driving circuit, connected to the motor, for driving the motor in accordance with the magnitude of a given speed command;

a sensor, coupled to the motor, for generating a pulse whenever the motor rotates by a predetermined amount;

movement monitoring means, connected to said sensor, for monitoring the current position of the electrode on the basis of a value obtained from the number of pulses generated by said sensor; and control means, connected to said memory, and between said driving circuit and said movement monitoring means, for applying machining feed speed information contained in the command data to said driving circuit, for reading in and applying to said driving circuit, when a signal indicative of a short circuit is generated, retraction speed information contained in the retraction control information stored in said memory, and for reading in and applying to said driving circuit, when a signal indicative of an end to the short circuit is generated, re-advancing speed information contained in the retraction control information stored in said memory.

8. An apparatus for controlling an electric discharge machine wherein a motor for establishing relative movement between an energized electrode and a workpiece is driven in accordance with command data in order to machine the workpiece to a desired shape by an electric discharge produced between the electrode and workpiece, said apparatus comprising:

a memory for storing retraction control information contained in entered command data;

a driving circuit, operatively connected to the motor, for driving the motor in accordance with the magnitude of a given speed command;

a sensor, coupled to the motor, for generating a pulse whenever the motor rotates by a predetermined amount;

movement monitoring means, operatively connected to said sensor, for monitoring the current position of the electrode on the basis of a value obtained from the number of pulses generated by said sensor;

control means, operatively connected to said memory, said driving circuit and said movement monitoring means, for applying machining feed speed information contained in the command data to said driving circuit, for reading in and applying to said driving circuit, when a signal indicative of a short circuit is generated, retraction speed information contained in the retraction control information stored in said memory, and for reading in and applying to said driving circuit, when a signal indicative of an end to the short circuit is generated, re-advancing speed information contained in the retraction control information stored in said memory; and counting means, operatively connected to said movement monitoring means and said sensor, for counting the pulses generated by said sensor.

9. An apparatus for controlling an electric discharge machine according to claim 8, wherein said movement monitoring means reads counted values out of said counting means for cumulatively adding the read values, and applies a command to said counting means each time its counted value is read, thereby to cancel said counted value.

10. An apparatus for controlling an electric discharge machine according to claim 9, wherein said movement monitoring means clears said counting means each time its counted value is read.

11. An apparatus for controlling an electric discharge machine according to claim 9, further comprising a pulse distributing circuit, operatively connected to said control means and said counting means, which receives the counted value read by said movement monitoring means following a reversal in sign, for supplying said counting means with a number of pulses in conformance with said received counted value.

12. An apparatus for controlling an electric discharge machine according to claim 11, wherein said movement monitoring means reads the counted value in said counting means in response to a completion pulse generated by said pulse distributing circuit after the counting means is supplied with said pulses.

13. An apparatus for controlling an electrode of an electric discharge machine during machining of a workpiece, comprising:

electrode movement and sensing means for driving the electrode and the sensing the position of the electrode;

position error determination means, connected to said electrode movement and sensing means, for determining the difference in the position of the electrode and a target position;

control means, connected to said electrode movement and sensing means and said position error determination means, for controlling the electrode movement and sensing means in dependence upon the difference, for providing the target position to said position error determination means and for controlling said electrode movement and sensing means in dependence upon a short circuit between the electrode and the workpiece.

14. An apparatus according to claim 13, wherein said control means produces a digital speed command, and wherein said electrode movement and sensing means comprises:

electrode movement means, connected between said control means and the electrode, for driving the electrode in accordance with the digital speed command; and electrode sensing means, connected between said position error determination means and the electrode, for producing feedback pulses for indicating the position of the electrode.

15. An apparatus according to claim 13, wherein said control means includes retraction means for retracting the electrode substantially immediately upon the short circuit.

16. An apparatus according to claim 15, wherein said control means further includes advancing means for advancing the electrode substantially immediately upon termination of the short circuit.

17. A method according to claim 1, wherein step (f) occurs substantially immediately after the end of the short circuit.

18. An apparatus as recited in claim 7, wherein said control means includes retraction means for retracting the electrode substantially immediately upon the short circuit.

19. An apparatus as recited in claim 7, wherein said control means further includes means for advancing the electrode substantially immediately upon termination of the short circuit.

* * * * *

UNITED STATES PATENT AND TRADEMARK OFFICE
CERTIFICATE OF CORRECTION

PATENT NO. : 4,538,098
DATED : AUGUST 27, 1985
INVENTOR(S) : MITSUO MATSUI ET AL.

It is certified that error appears in the above-identified patent and that said Letters Patent is hereby corrected as shown below:

Col. 2, line 19, "countes" should be --counts--.

Col. 4, line 17, "D/A" should be --SD--;
line 64, "DA" should be --D/A--.

Col. 10, line 53, delete "the" (second occurrence).

Signed and Sealed this

Twenty-fourth Day of December 1985

[SEAL]

Attest:

DONALD J. QUIGG

Attesting Officer

Commissioner of Patents and Trademarks